US012035127B2

(12) United States Patent
Laaksonen

(10) Patent No.: US 12,035,127 B2
(45) **Date of Patent: *Jul. 9, 2024**

(54) SPATIAL AUDIO CAPTURE, TRANSMISSION AND REPRODUCTION

(71) Applicant: Nokia Technologies Oy, Espoo (FI)

(72) Inventor: Lasse Laaksonen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 18/188,820

(22) Filed: Mar. 23, 2023

(65) Prior Publication Data

US 2023/0232182 A1 Jul. 20, 2023

Related U.S. Application Data

(63) Continuation of application No. 17/258,600, filed as application No. PCT/FI2019/050525 on Jul. 4, 2019, now Pat. No. 11,638,112.

(51) Int. Cl.
*H04S 7/00* (2006.01)
*G10L 19/008* (2013.01)

(52) U.S. Cl.
CPC ............ *H04S 7/304* (2013.01); *G10L 19/008* (2013.01); *H04S 2400/01* (2013.01); *H04S 2400/11* (2013.01); *H04S 2420/11* (2013.01)

(58) Field of Classification Search
CPC . G10L 19/008; G10L 19/167; H04S 2400/01; H04S 2420/03; H04S 3/02; H04S 1/007
(Continued)

(56) References Cited

U.S. PATENT DOCUMENTS 9,749,738 B1 8/2017 Adsumilli et al.
11,216,086 B2 1/2022 Wan
(Continued)

FOREIGN PATENT DOCUMENTS

CN 1018431114 A 9/2010
WO WO-2017/132396 A1 8/2017

OTHER PUBLICATIONS

Anonymous: "Draft MPEG-1 Audio Requirements" 123. MPEG Meeting; Jul. 16, 2018-Jul. 20, 2018; Ljubljana; (Motion Picture Expert Group or ISO/IEC JTC1/SC29/WG11) Jul. 20, 2018 (Jul. 20, 2018), XP030197587).
(Continued)

*Primary Examiner* — Alexander Krzystan
(74) *Attorney, Agent, or Firm* — Harrington & Smith

(57) ABSTRACT

An apparatus configured to: obtain at least one spatial audio signal that defines an audio scene forming at least in part an immersive media content; obtain metadata associated with the at least one spatial audio signal; obtain at least one augmentation control parameter associated with the at least one spatial audio signal; obtain at least one augmentation audio signal; render an output audio signal that is based, at least partially, on the at least one spatial audio signal, the metadata associated with the at least one spatial audio signal, the at least one augmentation control parameter, and the at least one augmentation audio signal; and obtain an indication that at least part of the at least one spatial audio signal has been omitted from the output audio signal based, at least partially, on at least part of the at least one augmentation audio signal included in the output audio signal.

20 Claims, 8 Drawing Sheets

(58) Field of Classification Search
USPC ............... 700/94; 381/310, 309, 306, 22, 23
See application file for complete search history.

(56) References Cited

U.S. PATENT DOCUMENTS

| | | | | |
|---|---|---|---|---|
| 11,263,438 | B2 | 3/2022 | Kaehler | |
| 11,275,433 | B2 | 3/2022 | Wedig | |
| 11,533,531 | B1 * | 12/2022 | Link | H04N 21/4302 |
| 2004/0146170 | A1 * | 7/2004 | Zint | H03G 5/04 381/103 |
| 2006/0287748 | A1 | 12/2006 | Layton et al. | |
| 2008/0091415 | A1 * | 4/2008 | Schafer | G10L 19/0208 704/E21.007 |
| 2009/0059958 | A1 * | 3/2009 | Nakata | H04L 69/14 370/474 |
| 2013/0236040 | A1 | 9/2013 | Crawford et al. | |
| 2015/0371645 | A1 | 12/2015 | Seo et al. | |
| 2015/0373474 | A1 | 12/2015 | Kraft et al. | |
| 2016/0088417 | A1 | 3/2016 | Kim et al. | |
| 2017/0208415 | A1 | 7/2017 | Ojala | |
| 2017/0354196 | A1 | 12/2017 | Tammam et al. | |
| 2018/0098173 | A1 | 4/2018 | Van Brandenburg et al. | |
| 2018/0139566 | A1 | 5/2018 | Crum | |
| 2018/0146316 | A1 | 5/2018 | Laaksonen et al. | |
| 2019/0387168 | A1 | 12/2019 | Smith | |
| 2020/0368616 | A1 | 11/2020 | Delamont | |
| 2021/0041220 | A1 | 2/2021 | Van Weeren | |

OTHER PUBLICATIONS

Herre Jurgen et al. “Parametric Coding of Audio Objects; Technology, Performance and Opportunities” Conference: 42$^{nd}$ International Conference: Semantic Audio; Jul. 2011, AES, 60 East 42$^{nd}$ Street, Room 2520 New York 10165-2520, USA Jul. 22, 2011, XP040567517).

Davide A. Mauro et al. Binaural Spatialization for 3D Immersive Audio Communication in a Virtual World Sep. 18, 2013; 1077952576-1077952576, Sep. 18, 2013, pp. 1-8 XP058044594, DOI: 10.1145/2544114.2544115.

“Open AL” Wikipedia, 5 pages.

* cited by examiner

Augmentation audio:
611

Audio objects
605
607
603
610
V = user Voice
User in 6DoF (MPEG-I) (to be augmented)
6DoF sound sources
613
Augment
Ambience
601
Augmentation control derived from 6DoF content metadata
Example augmentation controls:
614
616
618
620
Voice comm only
Objects only
Sector Y only
Full augmentation
603
605
601a
603
605
607
603
605
603
607
according to rotation X
619
601

User in 6DoF (MPEG-I) (augmented)

SPATIAL AUDIO CAPTURE, TRANSMISSION AND REPRODUCTION

FIELD

The present application relates to apparatus and methods for spatial sound capturing, transmission, and reproduction, but not exclusively for spatial sound capturing, transmission, and reproduction within an audio encoder and decoder.

BACKGROUND

Immersive audio codecs are being implemented supporting a multitude of operating points ranging from a low bit rate operation to transparency. An example of such a codec is the immersive voice and audio services (IVAS) codec which is being designed to be suitable for use over a communications network such as a 3GPP 4G/5G network. Such immersive services include uses for example in immersive voice and audio for virtual reality (VR). This audio codec is expected to handle the encoding, decoding and rendering of speech, music and generic audio. It is furthermore expected to support channel-based audio and scene-based audio inputs including spatial information about the sound field and sound sources. The codec is also expected to operate with low latency to enable conversational services as well as support high error robustness under various transmission conditions.

Furthermore parametric spatial audio processing is a field of audio signal processing where the spatial aspect of the sound is described using a set of parameters. For example, in parametric spatial audio capture from microphone arrays, it is a typical and an effective choice to estimate from the microphone array signals a set of parameters such as directions of the sound in frequency bands, and the ratios between the directional and non-directional parts of the captured sound in frequency bands. These parameters are known to well describe the perceptual spatial properties of the captured sound at the position of the microphone array. These parameters can be utilized in synthesis of the spatial sound accordingly, for headphones binaurally, for loudspeakers, or to other formats, such as Ambisonics.

An example of an augmented reality (AR)/virtual reality (VR)/mixed reality (MR) application is an audio (or audio-visual) environment immersion where 6 degrees of freedom (6DoF) content rendering is implemented. For example a group of friends may gather for a football game night, but one may not, for some reason, be able to physically join. This user may be able to watch an encoded video 6DoF enabled stream at home. The atmosphere at the football party may furthermore be captured by one of the users and transmitted to the absent user over a suitable low-delay communications link (for example over 5G) in such a manner that maps to and augments the 6DoF content rendering.

As well as providing immersive (user-generated) content the users at the football party may wish to initiate an immersive call (2-way) as well as or instead of immersive streaming (1-way).

SUMMARY

There is provided according to a first aspect an apparatus comprising means for: obtaining at least one spatial audio signal comprising at least one audio signal, wherein the at least one spatial audio signal defines an audio scene forming at least in part an immersive media content; obtaining at least one augmentation control parameter associated with the spatial audio signal, wherein the at least one augmentation control parameter is configured to control at least in part a rendering of the audio scene; and transmitting/storing the at least one spatial audio signals and the at least one augmentation control parameter, the at least one spatial audio signal and the at least one augmentation control parameter being received/retrieved at a renderer so as to control at least in part rendering of the audio scene based on the at least one augmentation control parameter.

The at least one spatial audio signal may comprise at least one spatial parameter associated with the at least one audio signal configured to define at least one audio object located at a defined position, wherein the at least one augmentation control parameter may comprise information on identifying which of the at least one audio objects can be muted or moved by the renderer within the rendering of the audio scene.

The at least one augmentation control parameter may comprise at least one of: a location defining a position or region within the audio scene the rendering is controlled; a level defining a control behaviour for the rendering; a time defining when a control of the rendering is active; and a trigger criteria defining when a control of the rendering is active.

The at least one augmentation control parameter may comprise a level defining the control behaviour for the rendering comprises at least one of: a first spatial augmentation control wherein the rendering of the audio scene based on the at least one augmentation control parameter allows no spatial augmentation of the audio scene; a second spatial augmentation control wherein the rendering of the audio scene based on the at least one augmentation control parameter allows spatial augmentation of the audio scene by a spatial augmentation audio signal in a limited range of directions from a reference position; a third spatial augmentation control wherein the rendering of the audio scene based on the at least one augmentation control parameter allows free spatial augmentation of the audio scene by a spatial augmentation audio signal; a fourth spatial augmentation control wherein the rendering of the audio scene based on the at least one augmentation control parameter allows augmentation of the audio scene of a voice audio object only; a fifth spatial augmentation control wherein the rendering of the audio scene based on the at least one augmentation control parameter allows spatial augmentation of the audio scene of audio objects only; a sixth spatial augmentation control wherein the rendering of the audio scene based on the at least one augmentation control parameter allows spatial augmentation of the audio scene of audio objects within a defined sector defined from a reference direction only; and a seventh spatial augmentation control wherein the rendering of the audio scene based on the at least one augmentation control parameter allows spatial augmentation of the audio scene audio objects and ambience parts.

According to a second aspect there is provided an apparatus comprising means for: obtaining at least one spatial augmentation audio signal comprising at least one augmentation audio signal and at least one spatial parameter associated with the at least one augmentation audio signal; transmitting/storing the at least one spatial augmentation audio signal, wherein the least one spatial augmentation audio signal being received/retrieved at a renderer for rendering of an audio scene based on at least one audio signal augmented with the at least one spatial augmentation audio signal and controlled at least in part based on at least one augmentation control parameter.

The at least one spatial parameter associated with the at least one augmentation audio signal may comprise at least one of: at least one defined voice object part; at least one defined audio object part; at least one ambience part; at least position related to at least one part; at least one orientation related to at least one part; and at least one shape related to at least one part.

According to a third aspect there is provided an apparatus comprising means for: obtaining at least one spatial audio signal comprising at least one audio signal, wherein the at least one audio signal defines an audio scene forming at least in part an immersive media content; obtaining at least one augmentation control parameter associated with the at least one audio signal; obtaining at least one spatial augmentation audio signal; rendering an audio scene based on the at least one spatial audio signal and the at least one augmentation audio signal and controlled at least in part based on the at least one augmentation control parameter.

The means for obtaining at least one spatial audio signal comprising at least one audio signal may be for decoding from a first bit stream the at least one spatial audio signal and the at least one spatial parameter.

The first bit stream may be a MPEG-I audio bit stream.

The means for obtaining at least one augmentation control parameter associated with the at least one audio signal may be further for decoding from the first bit stream the at least one augmentation control parameter associated with the at least one audio signal.

The means for obtaining at least one augmentation audio signal may be further for decoding from a second bit stream the at least one augmentation audio signal.

The second bit stream may be a low-delay path bit stream.

The means for obtaining at least one augmentation audio signal may be further for decoding from the second bit stream at least one spatial parameter associated with the at least one augmentation audio signal.

The at least one spatial audio signal may comprise at least one spatial parameter configured to define at least one audio object located at a defined position, the at least one augmentation control parameter may comprise information on identifying which of the at least one audio objects can be muted or moved, wherein the means for rendering an audio scene based on the at least one spatial audio signal and the at least one augmentation audio signal and controlled at least in part based on the at least one augmentation control parameter may be further for muting or moving the identified at least one audio objects within the audio scene.

The means for rendering an audio scene based on the at least one spatial audio signal and the at least one augmentation audio signal and controlled at least in part based on the at least one augmentation control parameter may be further for at least one of: defining a position or region within the audio scene within which rendering is controlled; defining at least one control behaviour for the rendering; defining an active period within which rendering is controlled; and defining a trigger criteria for activating when the rendering is controlled.

The means for defining at least one control behaviour for the rendering may be further for at least one of: rendering of the audio scene allows no spatial augmentation of the audio scene; rendering of the audio scene allows spatial augmentation of the audio scene by a spatial augmentation audio signal in a limited range of directions from a reference position; rendering of the audio scene allows free spatial augmentation of the audio scene by a spatial augmentation audio signal; rendering of the audio scene allows augmentation of the audio scene of a voice audio object only; rendering of the audio scene allows spatial augmentation of the audio scene of audio objects only; rendering of the audio scene allows spatial augmentation of the audio scene of audio objects within a defined sector defined from a reference direction only; and rendering of the audio scene allows spatial augmentation of the audio scene audio objects and ambience parts. According to a fourth aspect there is provided a method comprising: obtaining at least one spatial audio signal comprising at least one audio signal, wherein the at least one spatial audio signal defines an audio scene forming at least in part an immersive media content; obtaining at least one augmentation control parameter associated with the spatial audio signal, wherein the at least one augmentation control parameter is configured to control at least in part a rendering of the audio scene; and transmitting/storing the at least one spatial audio signals and the at least one augmentation control parameter, the at least one spatial audio signal and the at least one augmentation control parameter being received/retrieved at a renderer so as to control at least in part rendering of the audio scene based on the at least one augmentation control parameter.

The at least one spatial audio signal may comprise at least one spatial parameter associated with the at least one audio signal configured to define at least one audio object located at a defined position, wherein the at least one augmentation control parameter may comprise information on identifying which of the at least one audio objects can be muted or moved by the renderer within the rendering of the audio scene.

The at least one augmentation control parameter may comprise at least one of: a location defining a position or region within the audio scene the rendering is controlled; a level defining a control behaviour for the rendering; a time defining when a control of the rendering is active; and a trigger criteria defining when a control of the rendering is active.

The at least one augmentation control parameter may comprise a level defining the control behaviour for the rendering comprises at least one of: a first spatial augmentation control wherein the rendering of the audio scene based on the at least one augmentation control parameter allows no spatial augmentation of the audio scene; a second spatial augmentation control wherein the rendering of the audio scene based on the at least one augmentation control parameter allows spatial augmentation of the audio scene by a spatial augmentation audio signal in a limited range of directions from a reference position; a third spatial augmentation control wherein the rendering of the audio scene based on the at least one augmentation control parameter allows free spatial augmentation of the audio scene by a spatial augmentation audio signal; a fourth spatial augmentation control wherein the rendering of the audio scene based on the at least one augmentation control parameter allows augmentation of the audio scene of a voice audio object only; a fifth spatial augmentation control wherein the rendering of the audio scene based on the at least one augmentation control parameter allows spatial augmentation of the audio scene of audio objects only; a sixth spatial augmentation control wherein the rendering of the audio scene based on the at least one augmentation control parameter allows spatial augmentation of the audio scene of audio objects within a defined sector defined from a reference direction only; and a seventh spatial augmentation control wherein the rendering of the audio scene based on the at least one augmentation control parameter allows spatial augmentation of the audio scene audio objects and ambience parts.

According to a fifth aspect there is provided a method comprising: obtaining at least one spatial augmentation audio signal comprising at least one augmentation audio signal and at least one spatial parameter associated with the at least one augmentation audio signal; transmitting/storing the at least one spatial augmentation audio signal, wherein the least one spatial augmentation audio signal being received/retrieved at a renderer for rendering of an audio scene based on at least one audio signal augmented with the at least one spatial augmentation audio signal and controlled at least in part based on at least one augmentation control parameter.

The at least one spatial parameter associated with the at least one augmentation audio signal may comprise at least one of: at least one defined voice object part; at least one defined audio object part; at least one ambience part; at least position related to at least one part; at least one orientation related to at least one part; and at least one shape related to at least one part.

According to a sixth aspect there is provided a method comprising: obtaining at least one spatial audio signal comprising at least one audio signal, wherein the at least one audio signal defines an audio scene forming at least in part an immersive media content; obtaining at least one augmentation control parameter associated with the at least one audio signal; obtaining at least one spatial augmentation audio signal; rendering an audio scene based on the at least one spatial audio signal and the at least one augmentation audio signal and controlled at least in part based on the at least one augmentation control parameter.

Obtaining at least one spatial audio signal comprising at least one audio signal may comprise decoding from a first bit stream the at least one spatial audio signal and the at least one spatial parameter.

The first bit stream may be a MPEG-I audio bit stream.

Obtaining at least one augmentation control parameter associated with the at least one audio signal may comprise decoding from the first bit stream the at least one augmentation control parameter associated with the at least one audio signal.

Obtaining at least one augmentation audio signal may further comprise decoding from a second bit stream the at least one augmentation audio signal.

The second bit stream may be a low-delay path bit stream.

Obtaining at least one augmentation audio signal may further comprise decoding from the second bit stream at least one spatial parameter associated with the at least one augmentation audio signal.

The at least one spatial audio signal may comprise at least one spatial parameter configured to define at least one audio object located at a defined position, the at least one augmentation control parameter may comprise information on identifying which of the at least one audio objects can be muted or moved, wherein rendering an audio scene based on the at least one spatial audio signal and the at least one augmentation audio signal and controlled at least in part based on the at least one augmentation control parameter may further comprise muting or moving the identified at least one audio objects within the audio scene.

Rendering an audio scene based on the at least one spatial audio signal and the at least one augmentation audio signal and controlled at least in part based on the at least one augmentation control parameter may further comprise at least one of: defining a position or region within the audio scene within which rendering is controlled; defining at least one control behaviour for the rendering; defining an active period within which rendering is controlled; and defining a trigger criteria for activating when the rendering is controlled.

Defining at least one control behaviour for the rendering may further comprise at least one of: rendering of the audio scene allows no spatial augmentation of the audio scene; rendering of the audio scene allows spatial augmentation of the audio scene by a spatial augmentation audio signal in a limited range of directions from a reference position; rendering of the audio scene allows free spatial augmentation of the audio scene by a spatial augmentation audio signal; rendering of the audio scene allows augmentation of the audio scene of a voice audio object only; rendering of the audio scene allows spatial augmentation of the audio scene of audio objects only; rendering of the audio scene allows spatial augmentation of the audio scene of audio objects within a defined sector defined from a reference direction only; and rendering of the audio scene allows spatial augmentation of the audio scene audio objects and ambience parts. According to a seventh aspect there is provided an apparatus comprising at least one processor and at least one memory including a computer program code, the at least one memory and the computer program code configured to, with the at least one processor, cause the apparatus at least to: obtain at least one spatial audio signal comprising at least one audio signal, wherein the at least one spatial audio signal defines an audio scene forming at least in part an immersive media content; obtain at least one augmentation control parameter associated with the spatial audio signal, wherein the at least one augmentation control parameter is configured to control at least in part a rendering of the audio scene; and transmitting/storing the at least one spatial audio signals and the at least one augmentation control parameter, the at least one spatial audio signal and the at least one augmentation control parameter being received/retrieved at a renderer so as to control at least in part rendering of the audio scene based on the at least one augmentation control parameter.

The at least one spatial audio signal may comprise at least one spatial parameter associated with the at least one audio signal configured to define at least one audio object located at a defined position, wherein the at least one augmentation control parameter may comprise information on identifying which of the at least one audio objects can be muted or moved by the renderer within the rendering of the audio scene.

The at least one augmentation control parameter may comprise at least one of: a location defining a position or region within the audio scene the rendering is controlled; a level defining a control behaviour for the rendering; a time defining when a control of the rendering is active; and a trigger criteria defining when a control of the rendering is active.

The at least one augmentation control parameter may comprise a level defining the control behaviour for the rendering comprises at least one of: a first spatial augmentation control wherein the rendering of the audio scene based on the at least one augmentation control parameter allows no spatial augmentation of the audio scene; a second spatial augmentation control wherein the rendering of the audio scene based on the at least one augmentation control parameter allows spatial augmentation of the audio scene by a spatial augmentation audio signal in a limited range of directions from a reference position; a third spatial augmentation control wherein the rendering of the audio scene based on the at least one augmentation control parameter allows free spatial augmentation of the audio scene by a spatial augmentation audio signal; a fourth spatial augmentation control wherein the rendering of the audio scene based on the at least one augmentation control parameter allows augmentation of the audio scene of a voice audio object only; a fifth spatial augmentation control wherein the rendering of the audio scene based on the at least one augmentation control parameter allows spatial augmentation of the audio scene of audio objects only; a sixth spatial augmentation control wherein the rendering of the audio scene based on the at least one augmentation control parameter allows spatial augmentation of the audio scene of audio objects within a defined sector defined from a reference direction only; and a seventh spatial augmentation control wherein the rendering of the audio scene based on the at least one augmentation control parameter allows spatial augmentation of the audio scene audio objects and ambience parts.

According to an eighth aspect there is provided an apparatus comprising at least one processor and at least one memory including a computer program code, the at least one memory and the computer program code configured to, with the at least one processor, cause the apparatus at least to: obtain at least one spatial augmentation audio signal comprising at least one augmentation audio signal and at least one spatial parameter associated with the at least one augmentation audio signal; transmit/store the at least one spatial augmentation audio signal, wherein the least one spatial augmentation audio signal being received/retrieved at a renderer for rendering of an audio scene based on at least one audio signal augmented with the at least one spatial augmentation audio signal and controlled at least in part based on at least one augmentation control parameter.

The at least one spatial parameter associated with the at least one augmentation audio signal may comprise at least one of: at least one defined voice object part; at least one defined audio object part; at least one ambience part; at least position related to at least one part; at least one orientation related to at least one part; and at least one shape related to at least one part.

According to a ninth aspect there is provided an apparatus comprising at least one processor and at least one memory including a computer program code, the at least one memory and the computer program code configured to, with the at least one processor, cause the apparatus at least to: obtain at least one spatial audio signal comprising at least one audio signal, wherein the at least one audio signal defines an audio scene forming at least in part an immersive media content; obtain at least one augmentation control parameter associated with the at least one audio signal; obtain at least one spatial augmentation audio signal; render an audio scene based on the at least one spatial audio signal and the at least one augmentation audio signal and controlled at least in part based on the at least one augmentation control parameter.

The apparatus caused to obtain at least one spatial audio signal comprising at least one audio signal may be caused to decode from a first bit stream the at least one spatial audio signal and the at least one spatial parameter.

The first bit stream may be a MPEG-I audio bit stream.

The apparatus caused to obtain at least one augmentation control parameter associated with the at least one audio signal may be caused to decode from the first bit stream the at least one augmentation control parameter associated with the at least one audio signal.

The apparatus caused to obtain at least one augmentation audio signal may further be caused to decode from a second bit stream the at least one augmentation audio signal.

The second bit stream may be a low-delay path bit stream.

The apparatus caused to obtain at least one augmentation audio signal may further be caused to decode from the second bit stream at least one spatial parameter associated with the at least one augmentation audio signal.

The at least one spatial audio signal may comprise at least one spatial parameter configured to define at least one audio object located at a defined position, the at least one augmentation control parameter may comprise information on identifying which of the at least one audio objects can be muted or moved, wherein the apparatus caused to render an audio scene based on the at least one spatial audio signal and the at least one augmentation audio signal and controlled at least in part based on the at least one augmentation control parameter may further be caused to mute or move the identified at least one audio objects within the audio scene.

The apparatus caused to render an audio scene based on the at least one spatial audio signal and the at least one augmentation audio signal and controlled at least in part based on the at least one augmentation control parameter may further be caused to perform at least one of: define a position or region within the audio scene within which rendering is controlled; define at least one control behaviour for the rendering; define an active period within which rendering is controlled; and define a trigger criteria for activating when the rendering is controlled.

The apparatus caused to define at least one control behaviour for the rendering may further be caused to perform at least one of: render of the audio scene allows no spatial augmentation of the audio scene; render of the audio scene allows spatial augmentation of the audio scene by a spatial augmentation audio signal in a limited range of directions from a reference position; render of the audio scene allows free spatial augmentation of the audio scene by a spatial augmentation audio signal; render of the audio scene allows augmentation of the audio scene of a voice audio object only; render of the audio scene allows spatial augmentation of the audio scene of audio objects only; render of the audio scene allows spatial augmentation of the audio scene of audio objects within a defined sector defined from a reference direction only; and render of the audio scene allows spatial augmentation of the audio scene audio objects and ambience parts. According to a tenth aspect there is provided a computer program comprising instructions [or a computer readable medium comprising program instructions] for causing an apparatus to perform at least the following: obtaining at least one spatial audio signal comprising at least one audio signal, wherein the at least one spatial audio signal defines an audio scene forming at least in part an immersive media content; obtaining at least one augmentation control parameter associated with the spatial audio signal, wherein the at least one augmentation control parameter is configured to control at least in part a rendering of the audio scene; and transmitting/storing the at least one spatial audio signals and the at least one augmentation control parameter, the at least one spatial audio signal and the at least one augmentation control parameter being received/retrieved at a renderer so as to control at least in part rendering of the audio scene based on the at least one augmentation control parameter.

According to an eleventh aspect there is provided a computer program comprising instructions [or a computer readable medium comprising program instructions] for causing an apparatus to perform at least the following: obtaining at least one spatial augmentation audio signal comprising at least one augmentation audio signal and at least one spatial parameter associated with the at least one augmentation audio signal; transmitting/storing the at least one spatial augmentation audio signal, wherein the least one spatial augmentation audio signal being received/retrieved at a renderer for rendering of an audio scene based on at least one audio signal augmented with the at least one spatial augmentation audio signal and controlled at least in part based on at least one augmentation control parameter.

According to a twelfth aspect there is provided a computer program comprising instructions [or a computer readable medium comprising program instructions] for causing an apparatus to perform at least the following: obtaining at least one spatial audio signal comprising at least one audio signal, wherein the at least one audio signal defines an audio scene forming at least in part an immersive media content; obtaining at least one augmentation control parameter associated with the at least one audio signal; obtaining at least one spatial augmentation audio signal; rendering an audio scene based on the at least one spatial audio signal and the at least one augmentation audio signal and controlled at least in part based on the at least one augmentation control parameter.

According to a thirteenth aspect there is provided a non-transitory computer readable medium comprising program instructions for causing an apparatus to perform at least the following: obtaining at least one spatial audio signal comprising at least one audio signal, wherein the at least one spatial audio signal defines an audio scene forming at least in part an immersive media content; obtaining at least one augmentation control parameter associated with the spatial audio signal, wherein the at least one augmentation control parameter is configured to control at least in part a rendering of the audio scene; and transmitting/storing the at least one spatial audio signals and the at least one augmentation control parameter, the at least one spatial audio signal and the at least one augmentation control parameter being received/retrieved at a renderer so as to control at least in part rendering of the audio scene based on the at least one augmentation control parameter.

According to a fourteenth aspect there is provided a non-transitory computer readable medium comprising program instructions for causing an apparatus to perform at least the following: obtaining at least one spatial augmentation audio signal comprising at least one augmentation audio signal and at least one spatial parameter associated with the at least one augmentation audio signal; transmitting/storing the at least one spatial augmentation audio signal, wherein the least one spatial augmentation audio signal being received/retrieved at a renderer for rendering of an audio scene based on at least one audio signal augmented with the at least one spatial augmentation audio signal and controlled at least in part based on at least one augmentation control parameter.

According to a fifteenth aspect there is provided a non-transitory computer readable medium comprising program instructions for causing an apparatus to perform at least the following: obtaining at least one spatial audio signal comprising at least one audio signal, wherein the at least one audio signal defines an audio scene forming at least in part an immersive media content; obtaining at least one augmentation control parameter associated with the at least one audio signal; obtaining at least one spatial augmentation audio signal; rendering an audio scene based on the at least one spatial audio signal and the at least one augmentation audio signal and controlled at least in part based on the at least one augmentation control parameter.

According to a sixteenth aspect there is provided a computer readable medium comprising program instructions for causing an apparatus to perform the method as described above.

An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

Figure 1:
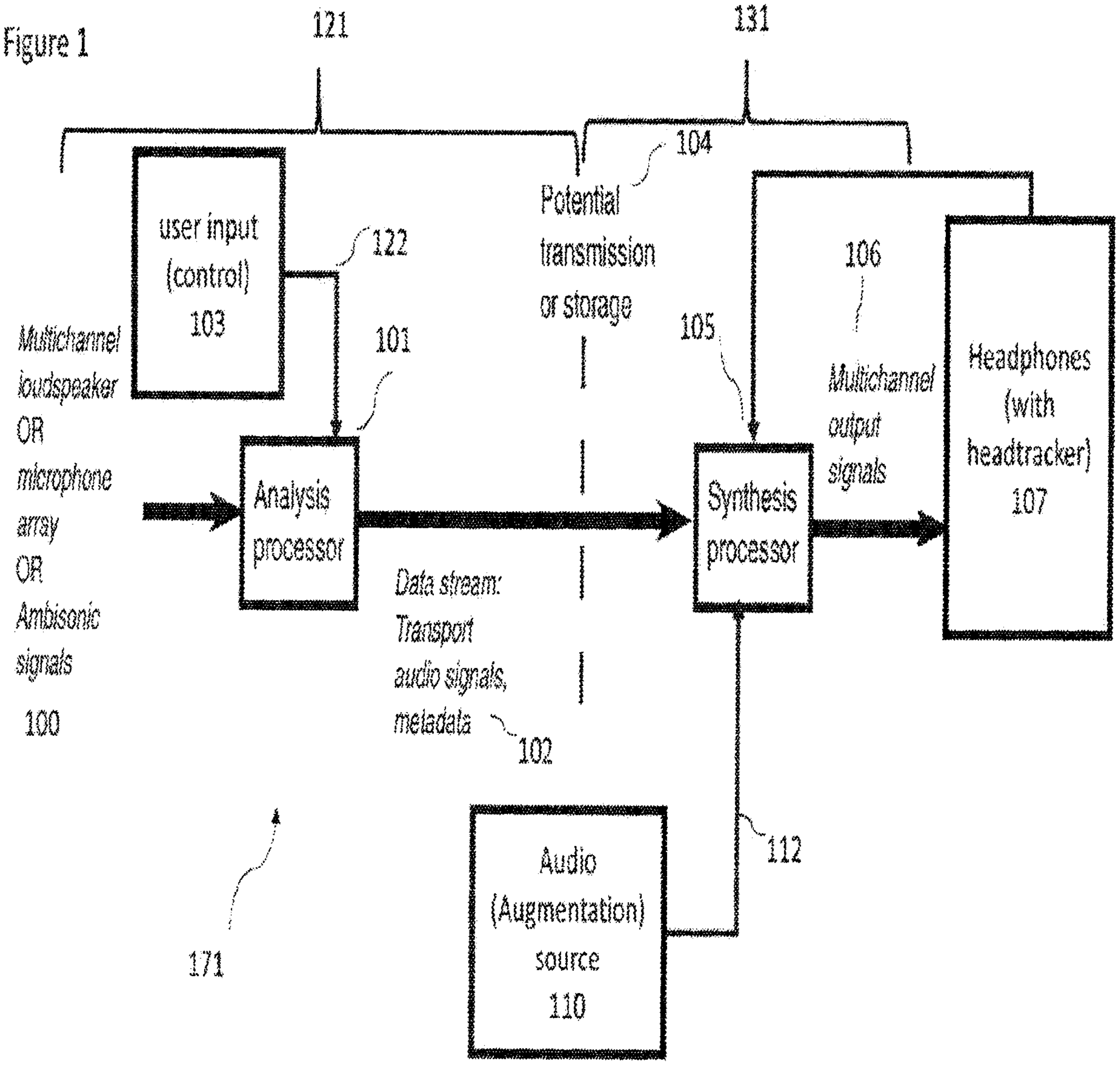
FIG. 1 shows schematically a system of apparatus suitable for implementing some embodiments.

The following describes in further detail suitable apparatus and possible mechanisms for the provision of effective control of spatial augmentation settings and signalling of immersive media content.

Combining at least two immersive media streams, such as immersive MPEG-I 6DoF audio content and a 3GPP EVS audio with spatial location metadata or 3GPP IVAS spatial audio, in a spatially meaningful way is possible when a common interface is implemented for the renderer. Using a common interface may for example allow a 6DoF audio content be augmented by a further audio stream. The augmenting content may be rendered at a certain position or positions in the 6DoF scene/environment or made for example follow the user position as a non-diegetic or alternatively a 3DoF diegetic rendering.

The embodiments as described herein attempt to reduce unwanted masking or other perceptual issues between the combinations of immersive media streams.

Furthermore embodiments as described herein attempt to maintain designed sound source relationships, for example within professional 6DoF content there can often be carefully thought-out relationships between sound sources in certain directions. This may manifest itself through prominent audio sources, background ambience or music for example or a temporal and spatial combination of them.

The embodiments as described herein may be able to enable a service or content provider to provide a social aspect to an immersive experience and allow their user to continue the experience also during a communications or brief content sharing/viewing from a second user (who may or may not be consuming the same 6DoF content), the will therefore have concern over how this is achieved.

In other words the embodiments as discussed herein attempt to overcome concerns from content owners as to which parts of, and to which degree, their 6DoF content offering can be augmented by a secondary stream.

For example, a first immersive media content stream/broadcast of a sporting event. This sporting event may be sponsored by a brand, which brings to the content their own elements including 6DoF audio elements. When a user is consuming this 6DoF content, they may receive an immersive audio call from a second user. This second user may be attending a different event sponsored by another brand. Thus, an immersive capture of the space in the "different event" could introduce "audio elements" such as advertisement tunes associated with the second brand into the "first brand experience" of the first user. While the immersive augmentation could be preferred by the user(s), it may be against the interest of the content provider/sponsor who may prefer a limited (for example mono) augmentation instead.

In some embodiments this control is provided to specify when and what can be augmented to the scene.

As such the concept as described in further detail herein is a provision of spatial augmentation settings and signalling of immersive media content that allows the content creator/publisher to specify which parts of a immersive content scene (such as viewpoints) an incoming low-delay path stream (or any augmenting/communications stream) is allowed to augment spatially and which parts are allowed to be augmented only with limited functionality (e.g., a group of audio object, a single spatially placed mono signal, a voice signal, or a mono voice signal only).

In some embodiments, the spatial augmentation control/allowance setting and signalling can be tier- or level-based. For example, this can allow for reduced metadata related to the spatial augmentation allowance, where based on the "tier value" the augmentation rules can be derived from other scene information. While disallowing all communications access to a content can potentially be a bad user experience, one tier could also be "no communications augmentation allowed".

In embodiments, where a "no communications augmentation allowed" tier, for example, is used, accepting an incoming communications stream may automatically place the current 6DoF content rendering, or a part of it, on pause.

In some embodiments the control mechanism between content provider and consumer may be implemented as metadata that controls the rendering of streams that do not belong to the current viewpoint or are not the current immersive audio. Such viewpoint audio can consist of a self-contained set of audio streams and spatial metadata (such as 6DoF metadata). The control metadata may in some embodiments be associated with the self-contained set of audio streams and spatial metadata. The control metadata may furthermore in some embodiments be at least one of: time-varying or location-varying. For example in the first case, the content owner may have configured to change the augmentation behaviour control at specific times in the content. In the second case, for example, the content owner can allow, 'more user control' of the augmentation when the user leaves a defined "sweet spot" for current content or for a different part of the 6DoF space being augmented.

The incoming stream for augmenting, for example, an immersive 3GPP based communications stream (using a suitable low-delay path input) can include at least one setting (metadata) to indicate the desired spatial rendering of the incoming audio. This can include for example direction, extent and rotation of the spatial audio scene.

In further embodiments, the user may be allowed to negotiate with the content publisher to select a coding/transmission mode that best fits the current rendering setting of the 6DoF content.

In yet further embodiments, the user can receive an indication of additional spatial content being available but cleft out' of the rendering due to current spatial augmentation restrictions in the content. In other words the content consumer user is configured to receive an indication that the output audio has been modified because of an implemented control or restriction.

In some embodiments the restriction or control may be overcome by a request from the rendering user. This request may for example comprise a payment offer.

In yet further embodiments, the signalling related to a 3DoF immersive audio augmentation may include metadata describing at least one of: the rotation, the shape (e.g., round sphere vs. ovoid for 3D, circle vs. oval for planar) of the scene and the desired distance of directional elements (which may include, e.g., individual object streams). User control for this information can be for example part of the transmitting device's UI.

In some embodiments, the 6DoF metadata can include information on what audio sources of the 6DoF can be replaced by augmented audio sources. In such a manner the embodiments may include the following advantages:

Enable multitasking for users wishing to experience immersive communications during content consumption;

Improve control of audio augmentation for better interoperability between 6DoF content consumption and (spatial) communications services;

Enable rich communication while maintaining content owner's "artistic intent" by specifying what type or level of audio augmentation is allowed for each content segment (in time and space); and Improve user experience by scaling of (immersive) augmentation in a controlled way thus maintaining immersion based on characteristics of the scene being augmented.

With respect to FIG. 1 an example apparatus and system for implementing embodiments of the application are shown. The system 171 is shown with a content production 'analysis' part 121 and a content consumption 'synthesis' part 131. The 'analysis' part 121 is the part from receiving a suitable input (multichannel loudspeaker, microphone array, ambisonics) audio signals 100 up to an encoding of the metadata and transport signal 102 which may be transmitted or stored 104. The 'synthesis' part 131 may be the part from a decoding of the encoded metadata and transport signal 104, the augmentation of the audio signal and the presentation of the generated signal (for example in a suitable binaural form 106 via headphones 107 which furthermore are equipped with suitable headtracking sensors which may signal the content consumer user position and/or orientation to the synthesis part).

The input to the system 171 and the 'analysis' part 121 is therefore audio signals 100. These may be suitable input multichannel loudspeaker audio signals, microphone array audio signals, or ambisonic audio signals.

The input audio signals 100 may be passed to an analysis processor 101. The analysis processor 101 may be configured to receive the input audio signals and generate a suitable data stream 104 comprising suitable transport signals. The transport audio signals may also be known as associated audio signals and be based on the audio signals. For example in some embodiments the transport signal generator 103 is configured to downmix or otherwise select or combine, for example, by beamforming techniques the input audio signals to a determined number of channels and output these as transport signals. In some embodiments the analysis processor is configured to generate a 2 audio channel output of the microphone array audio signals. The determined number of channels may be two or any suitable number of channels. It is understood that the size of a 6DoF scene can vary significantly between contents and use cases. Therefore, the example of 2 audio channel output of the microphone array audio signals can relate to a complete 6DoF audio scene or more often to a self-contained set that can describe, for example, a viewpoint in a 6DoF scene.

In some embodiments the analysis processor is configured to pass the received input audio signals 100 unprocessed to an encoder in the same manner as the transport signals. In some embodiments the analysis processor 101 is configured to select one or more of the microphone audio signals and output the selection as the transport signals 104. In some embodiments the analysis processor 101 is configured to apply any suitable encoding or quantization to the transport audio signals.

In some embodiments the analysis processor 101 is also configured to analyse the input audio signals 100 to produce metadata associated with the input audio signals (and thus associated with the transport signals). The metadata can consist, e.g., of spatial audio parameters which aim to characterize the sound-field of the input audio signals. The analysis processor 101 can, for example, be a computer (running suitable software stored on memory and on at least one processor), or alternatively a specific device utilizing, for example, FPGAs or ASICs.

In some embodiments the parameters generated may differ from frequency band to frequency band and may be particularly dependent on the transmission bit rate. Thus for example in band X all of the parameters are generated and transmitted, whereas in band Y only one of the parameters is generated and transmitted, and furthermore in band Z a different number (for example 0) parameters are generated or transmitted. A practical example of this may be that for some frequency bands such as the highest band some of the parameters are not required for perceptual reasons.

Furthermore in some embodiments a user input (control) 103 may be further configured to supply at least one user input 122 or control input which may be encoded as additional metadata by the analysis processor 101 and then transmitted or stored as part of the metadata associated with the transport audio signals. In some embodiments the user input (control) 103 is configured to either analyse the input signals 100 or be provided with analysis of the input signals 100 from the analysis processor 101 and based on this analysis generate the control input signals 122 or assist the user to provide the control signals.

The transport signals and the metadata 102 may be transmitted or stored. This is shown in FIG. 1 by the dashed line 104. Before the transport signals and the metadata are transmitted or stored they may in some embodiments be coded in order to reduce bit rate, and multiplexed to at least one stream. The encoding and the multiplexing may be implemented using any suitable scheme. For example, a multi-channel coding can be configured to find optimal channel pairs and single channel elements for an efficient encoding using stereo and mono coding methods.

At the synthesis side 131, the received or retrieved data (stream) may be input to a synthesis processor 105. The synthesis processor 105 may be configured to demultiplex the data (stream) to coded transport and metadata. The synthesis processor 105 may then decode any encoded streams in order to obtain the transport signals and the metadata.

The synthesis processor 105 may then be configured to receive the transport signals and the metadata and create a suitable multi-channel audio signal output 106 (which may be any suitable output format such as binaural, multi-channel loudspeaker or Ambisonics signals, depending on the use case) based on the transport signals and the metadata. In some embodiments with loudspeaker reproduction, an actual physical sound field is reproduced (using the loudspeakers 107) having the desired perceptual properties. In other embodiments, the reproduction of a sound field may be understood to refer to reproducing perceptual properties of a sound field by other means than reproducing an actual physical sound field in a space. For example, the desired perceptual properties of a sound field can be reproduced over headphones using the binaural reproduction methods as described herein. In another example, the perceptual properties of a sound field could be reproduced as an Ambisonic output signal, and these Ambisonic signals can be reproduced with Ambisonic decoding methods to provide for example a binaural output with the desired perceptual properties.

In some embodiments the output device, for example the headphones, may be equipped with suitable headtracker or more generally user position and/or orientation sensors configured to provide position and/or orientation information to the synthesis processor 105.

Furthermore in some embodiments the synthesis side is configured to receive an audio (augmentation) source 110 audio signal 112 for augmenting the generated multi-channel audio signal output. The synthesis processor 105 in such embodiments is configured to receive the augmentation source 110 audio signal 112 and is configured to augment the output signal in a manner controlled by the control metadata as described in further detail herein.

The synthesis processor 105 can in some embodiments be a computer (running suitable software stored on memory and on at least one processor), or alternatively a specific device utilizing, for example, FPGAs or ASICs.

Figure 2:
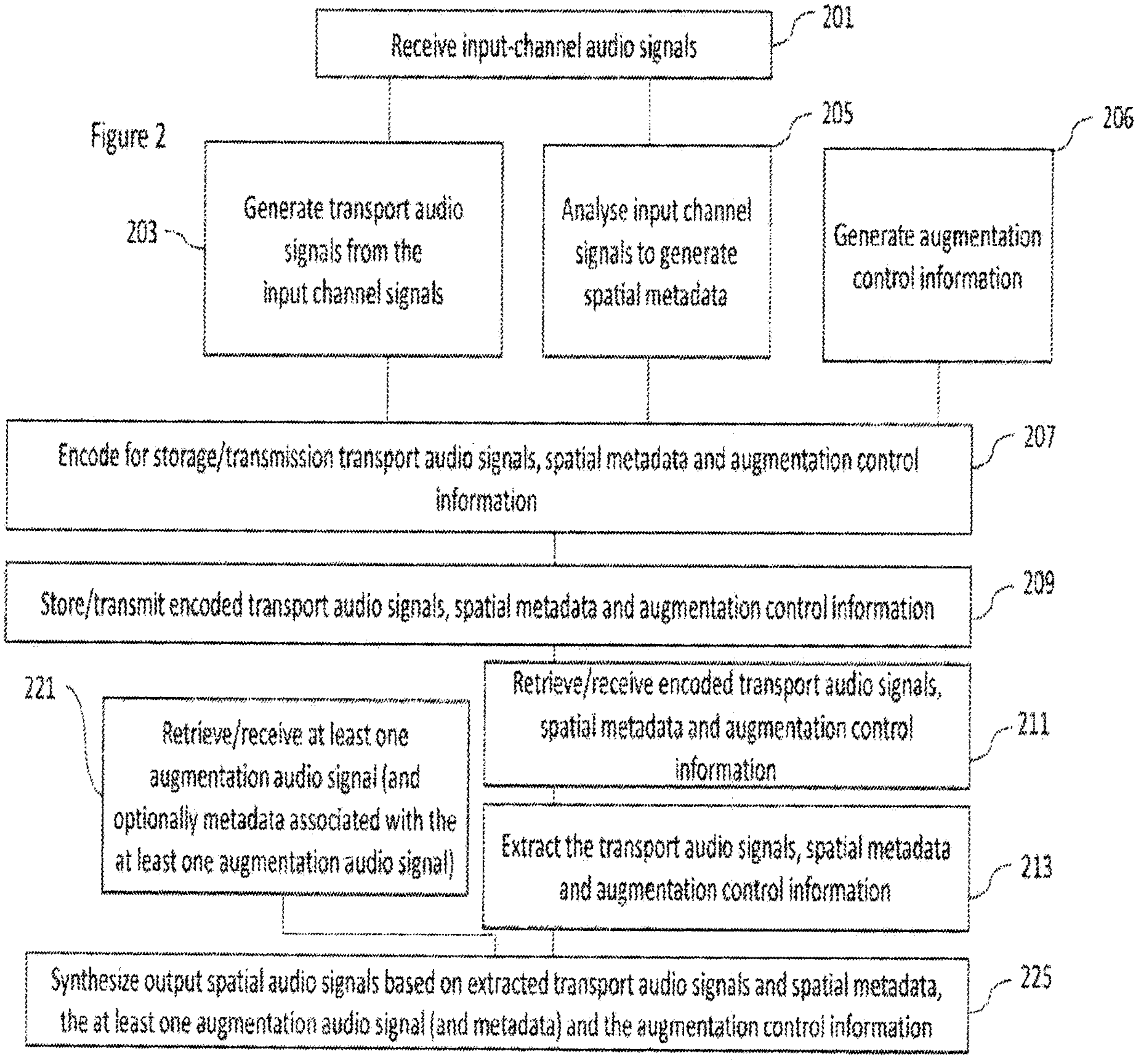
FIG. 2 shows a flow diagram of the operation of the system as shown in FIG. 1 according to some embodiments.

With respect to FIG. 2 an example flow diagram of the overview shown in FIG. 1 is shown.

First the system (analysis part) is configured to receive input audio signals or suitable multichannel input as shown in FIG. 2 by step 201.

Then the system (analysis part) is configured to generate a transport signal channels or transport signals (for example downmix/selection/beamforming based on the multichannel input audio signals) as shown in FIG. 2 by step 203.

Also the system (analysis part) is configured to analyse the audio signals to generate spatial metadata related to the 6DoF scene as shown in FIG. 2 by step 205.

Also the system (analysis part) is configured to generate augmentation control information as shown in FIG. 2 by step 206. In some embodiments, this can be based on a control signal by an authoring user.

The system is then configured to (optionally) encode for storage/transmission the transport signals, the spatial metadata and control information as shown in FIG. 2 by step 207.

After this the system may store/transmit the transport signals, spatial metadata and control information as shown in FIG. 2 by step 209.

The system may retrieve/receive the transport signals, spatial metadata and control information as shown in FIG. 2 by step 211.

Then the system is configured to extract the transport signals, spatial metadata and control information as shown in FIG. 2 by step 213.

Furthermore the system may be configured to retrieve/receive at least one augmentation audio signal (and optionally metadata associated with the at least one augmentation audio signal) as shown in FIG. 2 by step 221.

The system (synthesis part) is configured to synthesize an output spatial audio signals (which as discussed earlier may be any suitable output format such as binaural, multi-channel loudspeaker or Ambisonics signals, depending on the use case) based on extracted audio signals, spatial metadata, the at least one augmentation audio signal (and metadata) and the augmentation control information as shown in FIG. 2 by step 225.

Figure 3:
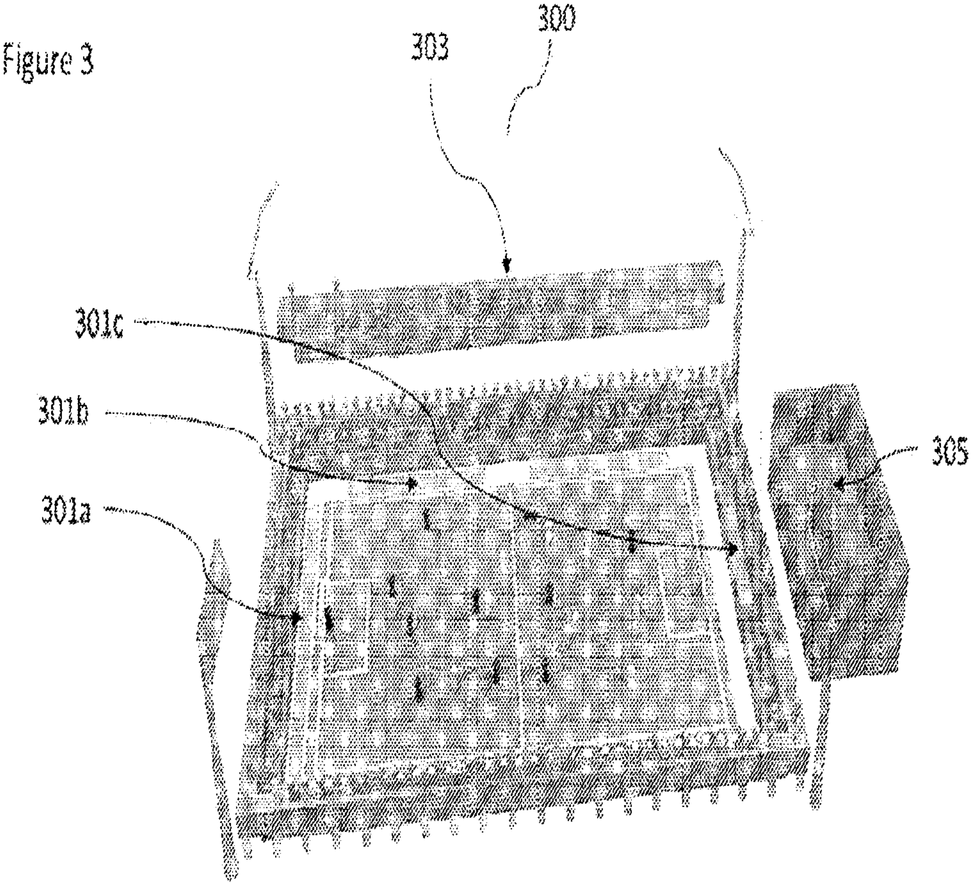
FIG. 3 shows schematically an example scenario for the capture/rendering of immersive spatial audio signals processing suitable for the implementation of some embodiments.

FIG. 3 illustrates an example use case of a sports arena/sports event 6DoF broadcast utilizing the apparatus/method shown in FIGS. 1 and 2. In this example the broadcast/streaming content is being captured by multiple VR cameras, other cameras, and microphone arrays. These may be used as the basis of the audio input as shown in FIG. 1 to be analysed and processed to generate the transport audio signals and spatial metadata.

A home user subscribed to the pay-per-view event can utilize VR equipment to experience the content in a number of areas allowing 6DoF movement (illustrated as the referenced areas in various parts of the arena). In addition, the user may be able to hear audio from other parts of the arena. For example, user may watch the game from the area behind the goal on the left-hand side, while listening to at least one audio being captured at the other end of the field.

In addition, the (content consumer or synthesis part) user may be connected to an immersive audio communications service that utilizes a suitable spatial audio codec and functions as the audio (augmentation) source. The communications service may be provided to the synthesis processor as a low-delay path input. An incoming caller (or audio signal or stream) may provide information about spatial placement of the (audio signal or) stream for augmenting the immersive content. In some embodiments the synthesis processor may control the spatial placement of the augmentation audio signal. In some cases, the control information may provide spatial placement information as a default placement where there is no spatial placement information associated with the augmentation audio signal or the (listener) user.

The content owner (via the analysis part) may control the immersive experience via the user input. For example, the user input may provide augmentation control such that the immersive audio content that is delivered to the user (and who is immersed in the 6DoF sports content) is not diminished but is able to provide a communications link to allow social use and other content consumption.

Thus for example in some embodiments the user input augmentation control information defines areas (within the 6DoF immersive scene/environment defining the arena) with different spatial audio augmentation properties. These areas may define augmentation control levels. These levels may define different levels of content control.

For example a first augmentation control level is shown in FIG. 3 by areas 301*a*, 301*b*, and 301*c*. These areas are defined such that any content consumer (user) located within these areas of the virtual content experiences content presented strictly according to content creator with no additional spatial audio modification or processing. Thus for example these areas may permit communications, however no spatial augmentation is allowed beyond a further user's voice stream (which may also have some limitation with respect to a spatial placement of the audio associated with the further user's voice stream).

A further augmentation control level may be shown in FIG. 3 by area 305. This area may be 'a VIP area' content within which the content consumer user is able to view the sports scene through a window and may listen to any audio content (such sports arena sound or, e.g., an incoming immersive audio stream) by default. However, the area may feature a temporal control window or time frame. During this time frame, spatial augmentation freedom is reduced. For example during this time frame the sports arena sound or a communications audio is provided with reduced spatial presence (e.g., in one direction only (towards the window) or as a mono stream only). Furthermore during this period the content consumer (user) may be able to choose the direction of the augmented audio, however they may not, for example replace a protected or reserved content type (for example where the reserved content type is a sponsored content audio stream or advertisement audio stream).

A third example augmentation control level area is shown in FIG. 3 with respect to the area 303. This is view from a nose-bleed section on the terraces. Within this area the augmentation control information may be such that the content consumer user is able to watch the match and augment the spatial audio with full freedom.

In such embodiments the content consumer user may for example be able to freely move between the areas (or 6DoF viewpoints), however the audio rendering is controlled differently in each area according to the content owner settings provided by the augmentation control information.

Figure 4:
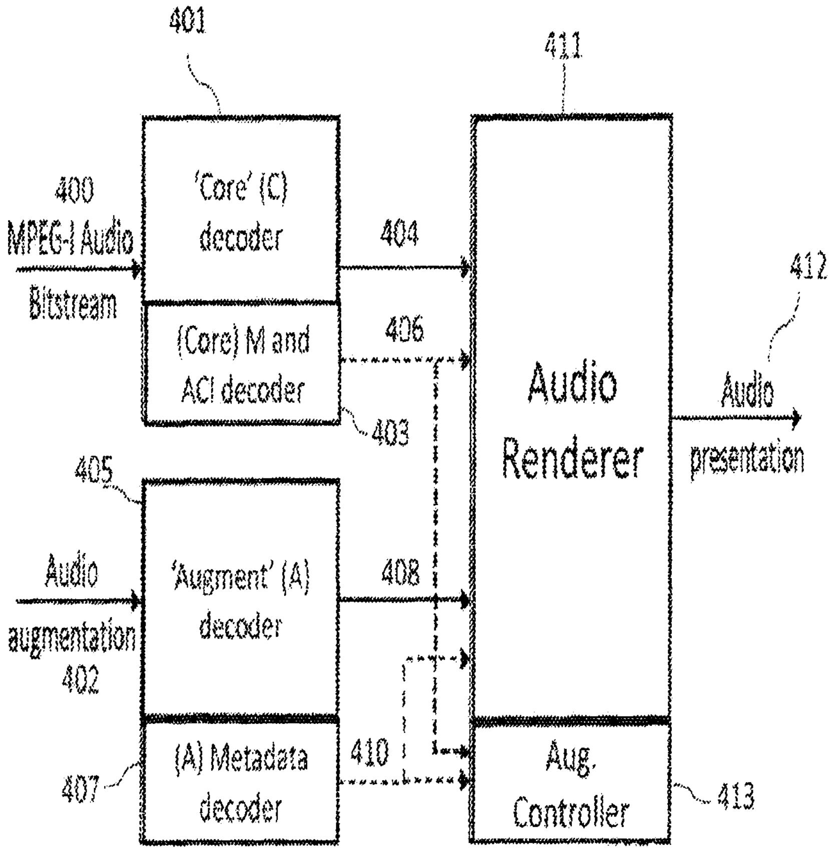
FIG. 4 shows schematically an example synthesis processor apparatus as shown in FIG. 1 suitable for implementing some embodiments.

With respect to FIG. 4 an example synthesis processor is shown according to some embodiments. The synthesis processor in some embodiments comprises a core part which is configured to receive the immersive content stream 400 (shown in FIG. 4 by the MPEG-I bit-stream). The immersive content stream 400 may comprise the transport audio signals, spatial metadata and augmentation control information (which may in some embodiments be considered to be a further metadata type). The synthesis processor may comprise a core part, an augmentation part and a controlled renderer part.

The core part may comprise a core decoder 401 configured to receive the immersive content stream 400 and output a suitable audio stream 404, for example a decoded transport audio stream, suitable to transmit to an audio renderer 411.

Furthermore the core part may comprise a core metadata and augmentation control information (M and ACI) decoder 403 configured to receive the immersive content stream 400 and output a suitable spatial metadata and augmentation control information stream 406 to be transmitted to the audio renderer 411 an the augmentation controller (Aug. Controller) 413.

The augmentation part may comprise an augment (A) decoder 405. The augment decoder 405 may be configured to receive the audio augmentation stream comprising audio signals to be augmented into the rendering, and output decoded audio signals 408 to the audio renderer 411. The augmentation part may further comprise a metadata decoder configured to decode from the audio augmentation input metadata such as spatial metadata 410 indicating a desired or preferred position for spatial positioning of the augmentation audio signals, the spatial metadata associated with the augmentation audio may be passed to the augmentation controller 413 and to the audio renderer 411. In some embodiments the augment part is a low delay path metadata and augmentation control (that may be part of the renderer) however in other embodiments any suitable path input may be used.

The controlled renderer part may comprise an augmentation controller 413. The augmentation controller may be configured to receive the augmentation control information and control the audio rendering based on this information. For example in some embodiments the augmentation control information defines the controlled areas and levels or tiers of control (and their behaviours) associated with augmentation in these areas.

The controlled renderer part may furthermore comprise an audio renderer 411 configured to receive the decoded immersive audio signals and the spatial metadata from the core part, the augmentation audio signals and the augmentation metadata from the augmentation part and generate a controlled rendering based on the audio inputs and the output of the augmentation controller 413. In some embodiments the audio renderer 411 comprises any suitable baseline 6DoF decoder/renderer (for example a MPEG-I 6DoF renderer) configured to render the 6DoF audio content according to the user position and rotation. In some embodiments, the audio content being augmented may be a 3DoF/3DoF+ content and the audio renderer 411 comprises a suitable 3DoF/3DoF+ content decoder/renderer. In parallel it may receive indications or signals from the augmentation controller based on the 'position' of the content consumer user and any controlled areas. This may be used, at least in part, to determine whether audio augmentation is allowed to begin. For example, an incoming call could be blocked or the 6DoF content rendering paused (according to user settings), if the current content allows no augmentation and augmentation is pushed. Alternatively and in addition, the augmentation control is utilized when an incoming stream is available and the system determines how to render it.

Figure 5:
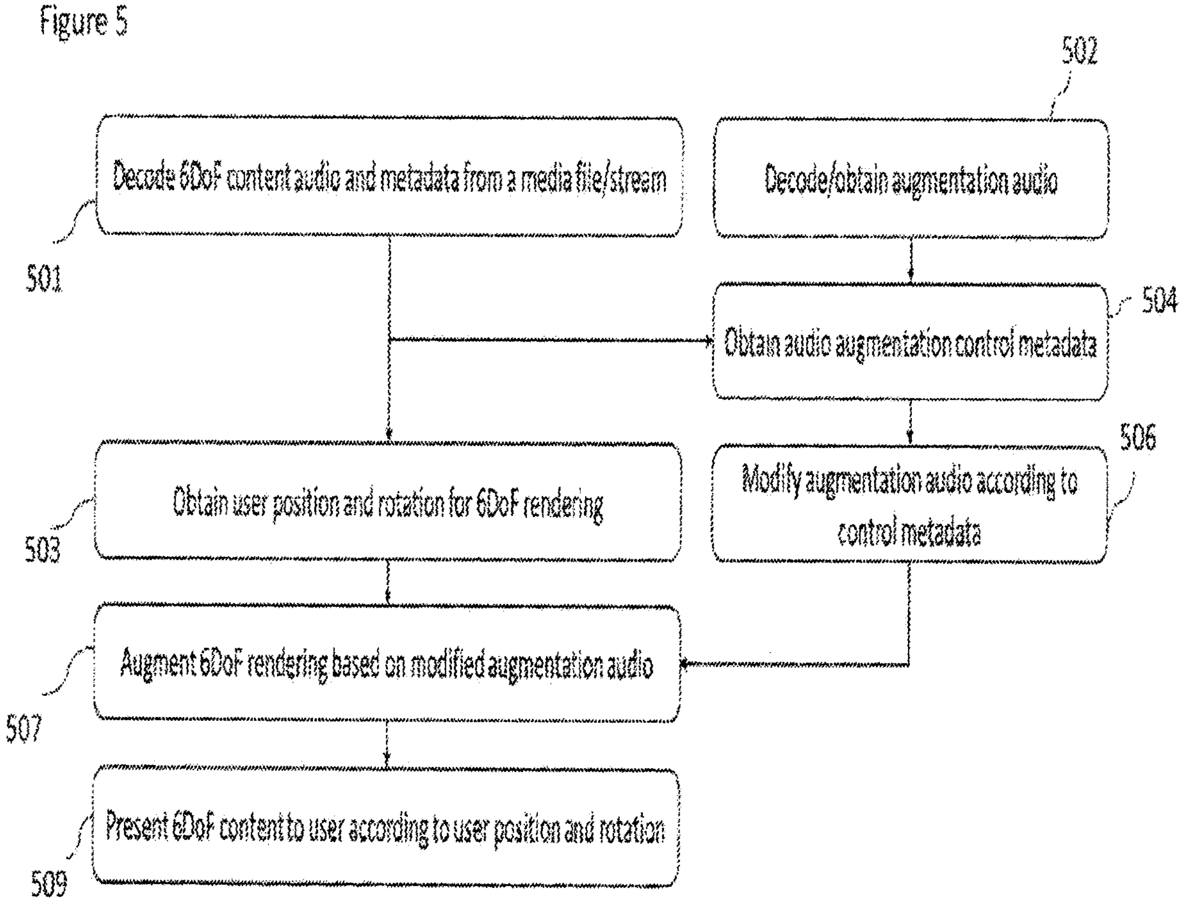
FIG. 5 shows a flow diagram of the operation of the synthesis processor apparatus as shown in FIG. 4 according to some embodiments.

With respect to FIG. 5 is shown an example flow diagram of the rendering operation with controlled augmentation according to some embodiments.

The immersive content (spatial or 6DoF content) audio and associated metadata may be decoded from a received/retrieved media file/stream as shown in FIG. 5 by step 501.

In some embodiments the augmentation audio (and associated spatial metadata) may be decoded/obtained as shown in FIG. 5 by step 502.

Furthermore the augmentation control information (metadata) may be obtained (for example from the immersive content file/stream) as shown in FIG. 5 by step 504.

In some embodiments the augmentation audio is modified based on the augmentation control information (for example in some embodiments the augmentation audio is modified to be a mono audio signal when the user is located in a restricted region or within a restricted time period) as shown in FIG. 5 by step 506.

The user position and rotation control may be configured to furthermore obtain a content consumer user position and rotation for the 6DoF rendering operation as shown in FIG. 5 by step 503.

Having generated the base 6DoF render the render is augmented based on the modified augmentation audio signal as shown in FIG. 5 by step 507.

The augmented rendering may then be presented to the content consumer user based on the content consumer user position and rotation as shown in FIG. 5 by step 509.

Figure 6:
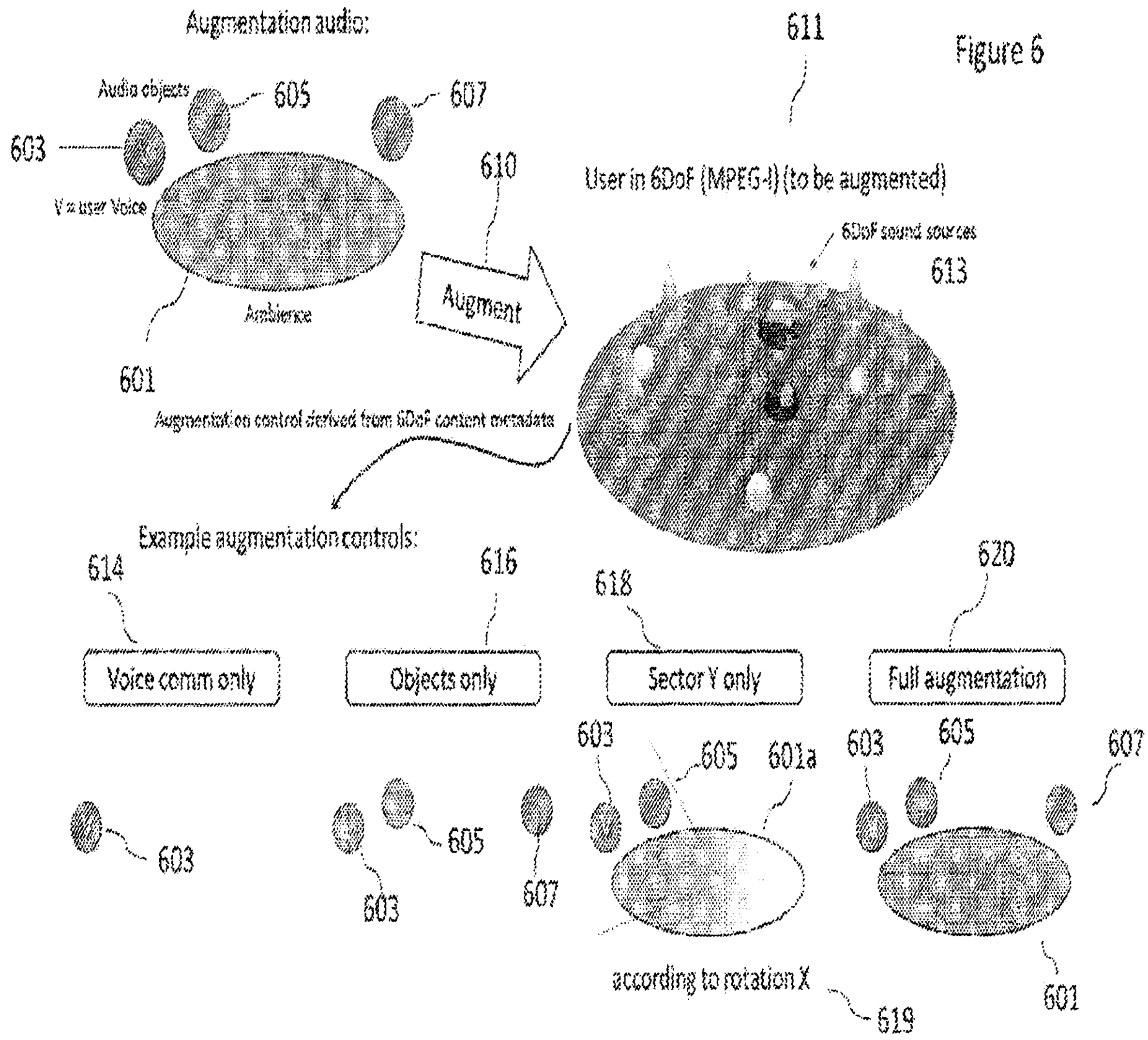
FIGS. 6 and 7 shows schematically examples of the effect of the augmentation control on an example augmentation scenario according to some embodiments.
Figure 7:
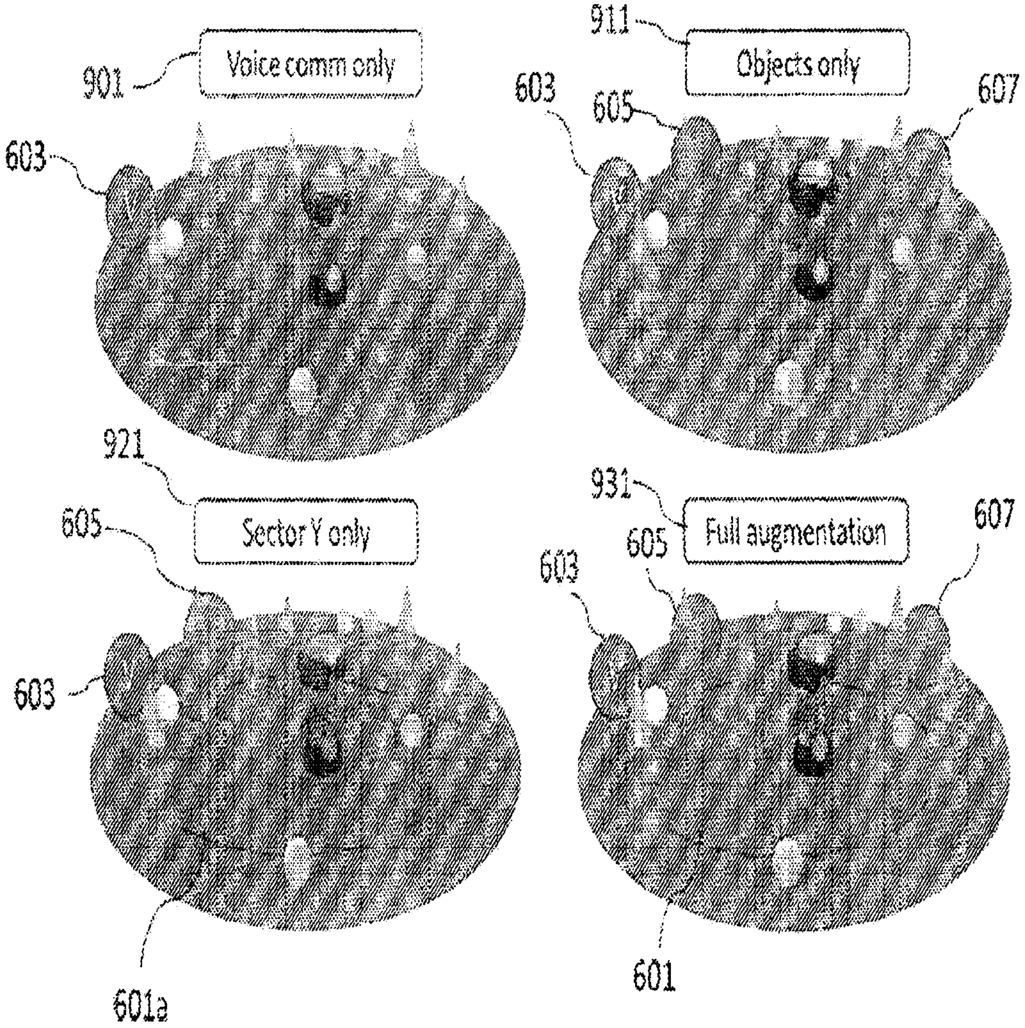

FIGS. 6 and 7 show an example of the effect of augmentation control settings that may be part of the spatial audio (6DoF) content and signalled as metadata. In the following examples these may be expressed as spatial audio augmentation levels. As shown herein the spatial audio (6DoF content) can comprise a self-contained set of audio signals (transport audio signals and spatial metadata), and the augmentation control metadata (the augmentation control information). The spatial audio file/stream may thus indicate in general rules for the augmentation of rendered versions of the audio signals with additional audio. For example as shown in FIG. 6 the spatial audio may comprise an audio scene 611 comprising various sound sources, shown as 6DoF sound sources 613.

Furthermore an augmentation audio signal 610 is shown. The augmentation audio signal is shown in FIG. 6 comprising a user voice 603 audio part located at a first location, additional audio object parts 605 and 607 located at a second location and third location respectively, and an ambience 601 part.

For example, a time-varying augmentation control may by default allow a full augmentation 620. The full augmentation 620 control renders a combination of the spatial audio (6DoF) content, user voice 603 audio part located at a first location, additional audio object parts 605 and 607 located at a second location and third location respectively, and ambience 601 part.

The augmented rendering thus is shown in FIG. 7 by the full augmentation representation 931.

However, a time-varying augmentation control may furthermore restrict the augmentation audio to a specific sector, for example sector Y as shown in FIG. 6. This sector Y based augmentation is shown in FIG. 6 where the rendering is controlled to only present augmentation audio associated with the ambience part in sector Y 601*a*, the user voice 603 audio part located at a first location and within sector Y, and only the additional audio object part 605 within sector Y (but not audio object part 607 which is outside the sector Y). The sector Y may be defined, for example, according to at least one scene rotation information X. In some embodiments, at least one audio object location in the augmentation audio may be modified in order for said audio object to not be in the sector that is not allowed. In some further embodiments, the whole augmented audio scene may be re-rotated in order to include key audio components in the allowed sector Y.

The augmented rendering thus is shown in FIG. 7 by the sector Y augmentation representation 921.

A further time-varying augmentation control may be the rendering of the audio object parts and restrict any ambience part. This object only 616 control is shown in FIG. 6 by the rendering of user voice 603 audio part located at a first location, additional audio object parts 605 and 607 located at a second location and third location respectively. A separated or separately provided ambient part, for example, is not allowed to be augmented to the spatial (6DoF) content.

The augmented rendering thus is shown in FIG. 7 by the objects only augmentation representation 911.

Furthermore a time-varying augmentation control may be the rendering of the voice only audio object part. Thus this voice communications only 614 control is shown in FIG. 6 by the rendering of user voice 603 audio part located at a first location and not the additional audio object parts 605 and 607 located at a second location and third location respectively and the ambience part 601.

The augmented rendering thus is shown in FIG. 7 by the voice only augmentation representation 901.

Thus for example when in a 6DoF AR/VR scene/environment 611 an important audio event (e.g., a special advertisement) is launching, the audio augmentation control may phase out the augmented ambience 601 and a main direction of interest based on the signalling in order to, for example, avoid the important audio event sound source being masked. As such the augmentation audio is controlled such that it does not overlap with the upcoming 6DoF content direction of interest.

Thus, the audio augmentation control information may be used in the 6DoF audio renderer to control the direction and/or location of augmented audio objects/sources in combination with the transmitted direction/location (from the service/user transmitting the augmented audio) and with the local direction/location setting. It is thus understood that in various embodiments, the important/allowed augmentation component(s) may also be moved (e.g., via a rotation of the augmented scene relative to the user position or via other means) to a suitable position in the augmented scene.

The embodiments may therefore improve user's ability for multitasking. Rich communications is generally enabled during 6DoF media content consumption, when immersive audio augmentation from a communications source is allowed. However, this can in some cases result in reduced immersion for the 6DoF content or a bad user experience, if there is, e.g., a lot of ambience content present in both the 6DoF content and the immersive augmentation signal. Thus, the content producer may wish to allow immersive augmentation only when the scene is relatively quiet or mainly consists of dominating sound sources and a less important ambience part. In such case, it may be signalled that the immersive augmentation signal is allowed to augment or even replace the content's ambience. On the other hand, in "rich" sequences, it may be signalled that only object-based sound source augmentation is allowed.

By augmentation of a 6DoF media content by at least a secondary media content that can be a user-generated media content according to embodiments a content-owner controlled generation of 'mash-ups' such as is currently popular on the internet as memes may be enabled. In particular the controlled 6DoF mash-up generation may be dependent on user position and rotation as well as the media time.

Figure 8:
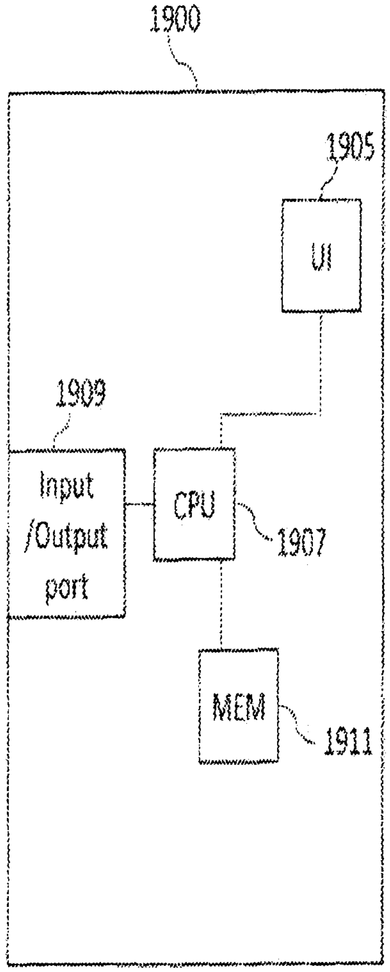
FIG. 8 shows schematically shows schematically an example device suitable for implementing the apparatus shown.

With respect to FIG. 8 an example electronic device which may be used as the analysis or synthesis device is shown. The device may be any suitable electronics device or apparatus. For example in some embodiments the device 1400 is a mobile device, user equipment, tablet computer, computer, audio playback apparatus, etc.

In some embodiments the device 1900 comprises at least one processor or central processing unit 1907. The processor 1907 can be configured to execute various program codes such as the methods such as described herein.

In some embodiments the device 1900 comprises a memory 1911. In some embodiments the at least one processor 1907 is coupled to the memory 1911. The memory 1911 can be any suitable storage means. In some embodiments the memory 1911 comprises a program code section for storing program codes implementable upon the processor 1907. Furthermore in some embodiments the memory 1911 can further comprise a stored data section for storing data, for example data that has been processed or to be processed in accordance with the embodiments as described herein. The implemented program code stored within the program code section and the data stored within the stored data section can be retrieved by the processor 1907 whenever needed via the memory-processor coupling.

In some embodiments the device 1900 comprises a user interface 1905. The user interface 1905 can be coupled in some embodiments to the processor 1907. In some embodiments the processor 1907 can control the operation of the user interface 1905 and receive inputs from the user interface 1905. In some embodiments the user interface 1905 can enable a user to input commands to the device 1900, for example via a keypad. In some embodiments the user interface 1905 can enable the user to obtain information from the device 1900. For example the user interface 1905 may comprise a display configured to display information from the device 1900 to the user. The user interface 1905 can in some embodiments comprise a touch screen or touch interface capable of both enabling information to be entered to the device 1900 and further displaying information to the user of the device 1900.

In some embodiments the device 1900 comprises an input/output port 1909. The input/output port 1909 in some embodiments comprises a transceiver. The transceiver in such embodiments can be coupled to the processor 1907 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver or transceiver means can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The transceiver input/output port 1909 may be configured to receive the loudspeaker signals and in some embodiments determine the parameters as described herein by using the processor 1907 executing suitable code. Furthermore the device may generate a suitable transport signal and parameter output to be transmitted to the synthesis device.

In some embodiments the device 1900 may be employed as at least part of the synthesis device. As such the input/output port 1909 may be configured to receive the transport signals and in some embodiments the parameters determined at the capture device or processing device as described herein, and generate a suitable audio signal format output by using the processor 1907 executing suitable code. The input/output port 1909 may be coupled to any suitable audio output for example to a multichannel speaker system and/or headphones or similar.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising:

at least one processor; and at least one non-transitory memory storing instructions that, when executed by the at least one processor, cause the apparatus at least to:

obtain at least one spatial audio signal comprising at least one audio signal, wherein the at least one spatial audio signal defines an audio scene;

obtain at least one control parameter associated with the at least one spatial audio signal, wherein the at least one control parameter is configured to control at least in part a rendering of the audio scene; and provide the at least one spatial audio signal and the at least one control parameter for use at a renderer so as to enable control of, at least in part, rendering of the audio scene based on the at least one control parameter.

2. The apparatus of claim 1, wherein the at least one spatial audio signal comprises at least one spatial parameter associated with the at least one audio signal, wherein the at least one spatial parameter is configured to define at least one audio object located at a defined position, wherein the at least one control parameter comprises information on identifying which of the at least one audio object is configured to be muted or moved by the renderer within the rendering of the audio scene.

3. The apparatus of claim 1, wherein the at least one control parameter comprises at least one of:

a location defining a position or region within the audio scene where the rendering is enabled to be controlled;

a level defining a control behavior for the rendering;

a time defining when a control of the rendering is enabled to be active; and a trigger criteria defining when a control of the rendering is enabled to be active.

4. The apparatus as claimed in claim 3, wherein the at least one control parameter comprises the level defining the control behavior for the rendering, wherein the at least one control parameter comprises at least one of:

a first spatial augmentation control, wherein the rendering of the audio scene based on the at least one control parameter allows no spatial augmentation of the audio scene;

a second spatial augmentation control, wherein the rendering of the audio scene based on the at least one control parameter allows spatial augmentation of the audio scene with a spatial augmentation audio signal in a limited range of directions from a reference position;

a third spatial augmentation control, wherein the rendering of the audio scene based on the at least one control parameter allows free spatial augmentation of the audio scene with a spatial augmentation audio signal;

a fourth spatial augmentation control, wherein the rendering of the audio scene based on the at least one control parameter allows augmentation of the audio scene with a voice audio object;

a fifth spatial augmentation control, wherein the rendering of the audio scene based on the at least one control parameter allows spatial augmentation of the audio scene with audio objects;

a sixth spatial augmentation control, wherein the rendering of the audio scene based on the at least one control parameter allows spatial augmentation of the audio scene with audio objects within a defined sector defined from a reference direction; or a seventh spatial augmentation control, wherein the rendering of the audio scene based on the at least one control parameter allows spatial augmentation of the audio scene with audio objects and ambience parts.

5. An apparatus comprising:

at least one processor; and at least one non-transitory memory storing instructions that, when executed by the at least one processor, cause the apparatus at least to:

obtain at least one spatial augmentation audio signal comprising at least one augmentation audio signal and at least one spatial parameter associated with the at least one augmentation audio signal; and provide the at least one spatial augmentation audio signal for use at a renderer for enabling rendering of an audio scene based, at least partially, on at least one audio signal augmented with the at least one spatial augmentation audio signal and at least one control parameter.

6. The apparatus as claimed in claim 5, wherein the at least one spatial parameter associated with the at least one augmentation audio signal comprises at least one of:

at least one defined voice object part, at least one defined audio object part, at least one ambience part, at least one position related to at least one of: the at least one defined voice object part, the at least one defined audio object part, or the at least one ambience part, at least one orientation related to the at least one of: the at least one defined voice object part, the at least one defined audio object part, or the at least one ambience part, or at least one shape related to the at least one of: the at least one defined voice object part, the at least one defined audio object part, or the at least one ambience part.

7. An apparatus comprising:

at least one processor; and at least one non-transitory memory storing instructions that, when executed by the at least one processor, cause the apparatus at least to:

obtain at least one spatial audio signal comprising at least one audio signal, wherein the at least one audio signal defines an audio scene;

obtain at least one control parameter associated with the at least one audio signal;

obtain at least one spatial augmentation audio signal; and render the audio scene based on the at least one spatial audio signal and the at least one spatial augmentation audio signal, wherein the rendering is controlled based, at least partially, on the at least one control parameter.

8. The apparatus as claimed in claim 7, wherein obtaining the at least one spatial audio signal comprises the at least one memory stores instructions that, when executed by the at least one processor, cause the apparatus to:

decode, from a first bit stream, the at least one spatial audio signal.

9. The apparatus as claimed in claim 8, wherein the first bit stream comprises a MPEG-1 audio bit stream.

10. The apparatus as claimed in claim 8, wherein obtaining the at least one control parameter comprises the at least one memory stores instructions that, when executed by the at least one processor, cause the apparatus to:

decode, from the first bit stream, the at least one control parameter.

11. The apparatus as claimed in claim 7, wherein obtaining the at least one spatial augmentation audio signal comprises the at least one memory stores instructions that, when executed by the at least one processor, cause the apparatus to:

decode, from a second bit stream, the at least one spatial augmentation audio signal.

12. The apparatus as claimed in claim 11, wherein the second bit stream comprises a low-delay path bit stream.

13. The apparatus as claimed in claim 11, wherein obtaining the at least one spatial augmentation audio signal comprises the at least one memory stores instructions that, when executed by the at least one processor, cause the apparatus to:

decode, from the second bit stream, at least one spatial parameter associated with the at least one spatial augmentation audio signal.

14. The apparatus as claimed in claim 7, wherein the at least one spatial audio signal comprises at least one spatial parameter configured to define at least one audio object located at a defined position, wherein the at least one control parameter comprises information on identifying which of the at least one audio object is configured to be muted or moved, wherein rendering the audio scene comprises the at least one memory stores instructions that, when executed by the at least one processor, cause the apparatus to at least one of:

mute the identified at least one audio object within the audio scene; or move the identified at least one audio object within the audio scene.

15. The apparatus as claimed in claim 7, wherein the at least one control parameter is configured to at least one of:

define a position or region within the audio scene within which rendering is controlled, define at least one control behavior for the rendering, define an active period within which rendering is controlled, or define a trigger criteria for activating when the rendering is controlled.

16. The apparatus as claimed in claim 15, wherein the at least one control parameter is configured to define the at least one control behavior for the rendering, wherein the at least one memory stores instructions that, when executed by the at least one processor, cause the apparatus to at least one of:

render the audio scene while allowing no spatial augmentation of the audio scene;

render the audio scene while allowing spatial augmentation of the audio scene with the at least one spatial augmentation audio signal in a limited range of directions from a reference position;

render the audio scene while allowing free spatial augmentation of the audio scene with the at least one spatial augmentation audio signal;

render the audio scene while allowing augmentation of the audio scene with a voice audio object;

render the audio scene while allowing spatial augmentation of the audio scene with audio objects;

render the audio scene while allowing spatial augmentation of the audio scene with audio objects within a defined sector defined from a reference direction; or render the audio scene while allowing spatial augmentation of the audio scene with audio objects and ambience parts.

17. A method comprising:

obtaining at least one spatial augmentation audio signal comprising at least one augmentation audio signal and at least one spatial parameter associated with the at least one augmentation audio signal; and provide the at least one spatial augmentation audio signal for use at a renderer for enabling rendering of an audio scene based, at least partially, on at least one audio signal augmented with the at least one spatial augmentation audio signal and at least one control parameter.

18. The method as claimed in claim 17, wherein the at least one spatial parameter associated with the at least one augmentation audio signal comprising at least one of:

at least one defined voice object part, at least one defined audio object part, at least one ambience part, at least one position related to at least one of: the at least one defined voice object part, the at least one defined audio object part, or the at least one ambience part, at least one orientation related to the at least one of: the at least one defined voice object part, the at least one defined audio object part, or the at least one ambience part, or at least one shape related to the at least one of: the at least one defined voice object part, the at least one defined audio object part, or the at least one ambience part.

19. A method comprising:

obtaining at least one spatial audio signal comprising at least one audio signal, wherein the at least one audio signal defines an audio scene;

obtaining at least one control parameter associated with the at least one audio signal;

obtaining at least one spatial augmentation audio signal; and rendering an audio scene based on the at least one spatial audio signal and the at least one spatial augmentation audio signal, wherein the rendering is controlled based, at least partially, on the at least one control parameter.

20. The method as claimed in claim 19, wherein the obtaining of the at least one spatial audio signal comprises:

decoding, from a first bit stream, the at least one spatial audio signal and the at least one control parameter.

* * * * *